(12) United States Patent
Miyaguchi et al.

(10) Patent No.: US 10,093,083 B2
(45) Date of Patent: Oct. 9, 2018

(54) BIAXIALLY ORIENTED, LAMINATED POLYAMIDE RESIN FILM

(75) Inventors: Yoshinori Miyaguchi, Inuyama (JP); Toshiyuki Shimizu, Inuyama (JP); Hirokazu Ooki, Inuyama (JP)

(73) Assignee: TOYOBO CO., LTD., Osaka (JP)

(*) Notice: Subject to any disclaimer, the term of this patent is extended or adjusted under 35 U.S.C. 154(b) by 0 days.

(21) Appl. No.: 14/239,720

(22) PCT Filed: Jun. 15, 2012

(86) PCT No.: PCT/JP2012/065318
§ 371 (c)(1),
(2), (4) Date: Feb. 19, 2014

(87) PCT Pub. No.: WO2013/027476
PCT Pub. Date: Feb. 28, 2013

(65) Prior Publication Data
US 2014/0212646 A1    Jul. 31, 2014

(30) Foreign Application Priority Data
Aug. 22, 2011 (JP) .................... 2011-180350

(51) Int. Cl.
| B32B 27/34 | (2006.01) |
| B32B 27/08 | (2006.01) |
| B32B 7/02  | (2006.01) |
| B32B 27/20 | (2006.01) |

(52) U.S. Cl.
CPC .............. *B32B 27/34* (2013.01); *B32B 7/02* (2013.01); *B32B 27/08* (2013.01); *B32B 27/20* (2013.01); *B32B 2264/10* (2013.01); *B32B 2264/12* (2013.01); *B32B 2307/412* (2013.01); *B32B 2307/518* (2013.01); *B32B 2307/746* (2013.01); *B32B 2439/70* (2013.01); *Y10T 428/2495* (2015.01); *Y10T 428/25* (2015.01); *Y10T 428/31728* (2015.04)

(58) Field of Classification Search
CPC .......... B32B 2264/10; B32B 2307/412; B32B 2307/518; B32B 2307/746; B32B 2439/70; B32B 27/34; Y10T 428/25; Y10T 428/31728
See application file for complete search history.

(56) References Cited

U.S. PATENT DOCUMENTS

| 5,792,808 | A  | * | 8/1998  | Sobuttka ................ C08J 3/226 508/136 |
| 6,562,475 | B2 |   | 5/2003  | Okudaira et al. |
| 8,137,817 | B2 |   | 3/2012  | Nishi et al. |
| 2001/0027230 | A1 | * | 10/2001 | Urabe ..................... C08J 5/18 524/447 |
| 2002/0018905 | A1 | * | 2/2002  | Okudaira et al. .......... 428/474.9 |
| 2007/0259164 | A1 |   | 11/2007 | Nishi et al. |
| 2008/0119633 | A1 | * | 5/2008  | Nishi et al. ................... 528/332 |
| 2008/0206531 | A1 | * | 8/2008  | Nishi et al. ................... 428/213 |
| 2009/0065979 | A1 |   | 3/2009  | Nishi et al. |
| 2011/0236635 | A1 |   | 9/2011  | Shimizu et al. |

FOREIGN PATENT DOCUMENTS

| CN | 1340002 A     | 3/2002  |
| CN | 1960869 A     | 5/2007  |
| CN | 101022941 A1  | 8/2007  |
| EP | 1176002 A1    | 1/2002  |
| EP | 2354179 A1    | 8/2011  |
| JP | 2002-011840 A | 1/2002  |
| JP | 2004-160842 A | 6/2004  |
| JP | 3671978 B1    | 7/2005  |
| JP | 2010-234552 A | 10/2010 |
| JP | 2010-253713 A | 11/2010 |
| WO | 2005/108071 A1| 11/2005 |

OTHER PUBLICATIONS

European Patent Office, Supplementary European Search Report in European Patent Application No. 12825068 dated Feb. 25, 2015.
Chinese Patent Office, First Office Action in Chinese Patent Application No. 201280034760.3 dated Jan. 14, 2015.
Washio, Kazuhiro, *Shimadzu Review*, 48(1): 35-49 (1991).
Japanese Patent Office, International Search Report in International Patent Application No. PCT/JP2012/065318 dated Sep. 18, 2012.
Chinese Patent Office, Second Office Action in Chinese Patent Application No. 201280034760.3 dated Aug. 25, 2015.

\* cited by examiner

*Primary Examiner* — Samir Shah
*Assistant Examiner* — Alicia J Sawdon
(74) *Attorney, Agent, or Firm* — Leydig, Voit & Mayer, Ltd.

(57) ABSTRACT

The present invention is to provide stable slipperiness in highly humid environments, further to provide suitability for printing and packaging with various design properties, stable bagmaking workability, and processability properties by simultaneously giving excellent transparency as same as that of common polyamide resin films, and still further to provide a biaxially oriented, laminated polyamide resin film producible at a low cost in the case of film production. A biaxially oriented, laminated polyamide resin film comprising at least one substrate layer and at least one slippery layer, wherein the substrate layer and the slippery layer contain polyamide resins and the biaxially oriented, laminated polyamide resin film has a static friction coefficient of 0.9 or lower in 65% RH environments and a haze value of 3.0% or lower.

15 Claims, No Drawings

BIAXIALLY ORIENTED, LAMINATED POLYAMIDE RESIN FILM

CROSS-REFERENCE TO RELATED APPLICATIONS

This patent application is the U.S. national phase of International Patent Application No. PCT/JP2012/065318, filed Jul. 15, 2012, which claims the benefit of Japanese Patent Application No. 2011-180350, filed on Aug. 22, 2011, which are incorporated by reference in their entireties herein.

TECHNICAL FIELD

The present invention relates to a biaxially oriented, laminated polyamide resin film excellent in toughness and pinhole resistance when used in the form of a laminate with, for example, an olefin type resin film of such as polyethylene, polypropylene, or the like for wrapping for retort food products or the like. The biaxially oriented, laminated polyamide resin film has stable handling workability under high humidity environments and a property for handing in a wide range as a product and excellent in transparency. The present invention provides a biaxially oriented, laminated polyamide resin film having both transparency so excellent as to satisfy the designs for a wide range of wrapping materials and slipperiness so excellent as to improve the workability for a bagmaking process by controlling the pore volume, average molecular diameter, and the addition amount of 2 kinds inorganic fine particles instead of the addition of poly(m-xylylene adipamide) (MXD6) for improving slipperiness and controlling the constitutional thickness ratio of the slippery layer. This method saves the raw material cost due to a decreased amount of MXD6 and prevents fluctuations in slipperiness due to seasonal influence.

BACKGROUND ART

Generally, due to excellent mechanical and thermal properties and high gas-barrier properties, polyamide stretch films obtained by stretching uniaxially or biaxially have been used widely as materials for packaging of liquid type food, moist food, frozen food, retort food, paste type food, livestock meat and seafood products, and heavy products such as soup, konjak, hamburg, miso paste, ham, rice, etc. These films to be used mainly for packaging are required to have good slipperiness and excellent workability for printing, vapor deposition, lamination, and bagmaking. However, conventional polyamide biaxially oriented films have a defective point in that their slipperiness is worsened by moisture absorption and softening in highly humid environments, and consequently, there are various problems attributed to deficiency in slipperiness at the time of handling or processing the films particularly in rainy seasons.

As a means for improving the slipperiness of a polyamide resin film, the following methods are proposed: (1) a method for decreasing the contact surface area of films on one another by adding fine particles of silica, kaolin, or the like to a resin, extruding these fine particles and forming fine projections on the surface of films by a stretching treatment; (2) a method for decreasing the contact surface area of films on one another by forming spherulite in the films; (3) a method for decreasing mutual action in contact portions of films on one another by adding an organic lubricant, such as higher fatty acid bisamide compounds or the like, to a polyamide resin; and (4) a method for making a film having a multi-layer structure by a coating, lamination, or co-extrusion method and forming a layer with improved slipperiness obtained by the methods (1) to (3) as a top surface layer.

However, in order to reliably obtain satisfactory workability even under high humidity for polyamide resin films obtained by methods (1) and (2), it is necessary to increase the addition amount of fine particles or spherulite for forming the projections on the film surface, and owing to that, the transparency of the film is lowered and it becomes a serious defect for packaging use for which a clear appearance is required. As compared with polyamide resin films obtained by methods (1) and (2), the polyamide resin film obtained by method (3) is provided with high slipperiness although slightly inferior in transparency. However, if the addition amount of an organic lubricant is increased to obtain sufficient slipperiness, it results in worsening of the sticking property and wettability to other materials at the time of layering or laminating the film on other materials and undesirably affects the processability for printing, vapor deposition, lamination, etc.

A method is therefore proposed for providing excellent slipperiness in highly humid environments by specifying the size of inorganic fine particles and the pore volume and controlling the ratio of the layer to which the fine particles are added (reference to Patent Document 1). In this method, although having remarkably excellent slipperiness in highly humid environments as well as transparency sufficient for packaging materials without any problem, films obtained by the method are difficult to be used for purposes required to have good designing properties.

As another method, a method is proposed for keeping slipperiness by adding a semi-aromatic polyamide resin to an aliphatic polyamide resin as a main component, making a resin with low moisture absorption exist in the film surface, and suppressing softening of the surface (Japanese Patent No. 3671978).

However, although the transparency decrease is suppressed to improve the slipperiness by addition of a semi-aromatic polyamide resin by this method. While this method can be an excellent technique for controlling the slipperiness, the method has a problem in terms of the cost that the raw material cost of a semi-aromatic polyamide resin is high, and the production cost tends to be high.

PRIOR ART DOCUMENTS

Patent Documents

Patent Document 1: International Publication No. 2005/108071
Patent Document 2: Japanese Patent No. 3671978

SUMMARY OF THE INVENTION

Problems to be Solved by the Invention

In view of the above state of the art, it is an object of the present invention to provide stable slipperiness in highly humid environments, further to provide suitability for printing and packaging with various design properties, stable bagmaking workability, and processability properties by simultaneously providing excellent transparency that is the same as that of common polyamide resin films, and still further to provide a biaxially oriented, laminated polyamide resin film producible at a low cost in the case of film production.

Solutions to the Problems

To solve the above problems, the inventors of the present invention made various investigations and consequently, completed the present invention. That is, the present invention is configured as follows.

1. A biaxially oriented, laminated polyamide resin film comprising at least one substrate layer and at least one slippery layer, wherein the substrate layer and the slippery layer contain polyamide resins and the biaxially oriented, laminated polyamide resin film has a static friction coefficient of 0.9 or lower in 65% RH environments and a haze value of 3.0% or lower.
2. The biaxially oriented, laminated polyamide resin film of embodiment 1, wherein the slippery layer contains at least 2 kinds of polyamide resins consisting of an aliphatic polyamide resin, and 1 to 5 wt % of a semi-aromatic polyamide resin, and contains 3000 to 5500 ppm of inorganic fine particles A having pore volume of 1.0 to 1.8 mL/g and average particle diameter of 2 to 7 μm, and 300 to 1000 ppm of inorganic fine particles B having pore volume of less than 1.0 mL/g and average particle diameter of smaller than 3 μm.
3. The biaxially oriented, laminated polyamide resin film of embodiment 1 or 2, wherein the slippery layer contains 0.05 to 0.30 wt % of ethylene bis(stearic acid amide).
4. The biaxially oriented, laminated polyamide resin film of any one of embodiments 1 to 3, wherein the biaxially oriented, laminated polyamide resin film is produced by a co-extrusion method and the slippery layer is layered on at least one face or both faces of the substrate layer.
5. The biaxially oriented, laminated polyamide resin film of any one of embodiments 1 to 4, wherein the thickness ratio of the total thickness of the slippery layer to the thickness of the entire laminated film is 6 to 30%.
6. The biaxially oriented, laminated polyamide resin film of any one of embodiments 1 to 5, wherein the substrate layer contains an aliphatic polyamide resin, or an aliphatic polyamide as well as a raw material recovered from its film.

Effect of the Invention

A biaxially oriented, laminated polyamide resin film of the present invention is excellent in bagmaking processability and printing processability in highly humid environments, is useful for economically producing packaging materials at high yield, and is preferably usable for a wide range of packaging purposes satisfying high design properties for which transparency is required since the film is highly transparent.

MODE FOR CARRYING OUT THE INVENTION

Hereinafter, a biaxially oriented, laminated polyamide resin film of the present invention will be described in detail.

The biaxially oriented, laminated polyamide resin film of the present invention preferably has a static friction coefficient of 0.9 or lower in atmosphere of 65% RH. If the static friction coefficient at 65% RH exceeds 0.9, the slipperiness is not necessarily sufficient and the handling properties in printing process, bagmaking process, and packing process are not necessarily sufficient.

The biaxially oriented, laminated polyamide resin film of the present invention preferably has haze of 3.0% or lower. If haze exceeds 3.0%, the transparency is not sufficiently improved and it becomes difficult to use the film for packaging material purposes with high design properties for which high transparency is required.

Further, regarding the biaxially oriented, laminated polyamide resin film of the present invention, at the time of film production of a laminated polyamide resin film by a co-extrusion method, a slippery layer is layered on at least one face or both faces of a substrate layer, the thickness ratio of the slippery layer to the film entire body is 6 to 30%, the slippery layer consists of an aliphatic polyamide resin and 1 to 5 wt % of a semi-aromatic polyamide resin, contains 3000 to 5500 ppm of inorganic fine particles A having pore volume of 1.0 to 1.8 mL/g and average particle diameter of 2 to 7 μm and 300 to 1000 ppm of inorganic fine particles B having pore volume of less than 1.0 mL/g and average particle diameter of smaller than 3 μm, and the substrate layer contains either an aliphatic polyamide resin or an aliphatic polyamide resin together with a raw material recovered from the film.

A polyamide resin to be used in the present invention is polymers having amido groups in molecular chains and practical examples may include polyamide resins such as nylon 6, nylon 7, nylon 11, nylon 12, nylon 66, nylon 6T, nylon MXD6 (poly(m-xylylene adipamide), nylon 61, nylon 46, etc., their copolymers, their blend, and their alloys, and if nylon 6 is used as an aliphatic polyamide resin, film production becomes easy and therefore, it is preferable. The semi-aromatic polyamide resin is preferably nylon MXD6 but it is not particularly limited to that.

The polyamide resin to be used for the present invention is preferable to have an oligomer content of 1 wt % or lower. If the oligomer content exceeds 1 wt %, the oligomer tends to be stuck in the case that the melted polyamide resin is rolled on a metal roll and therefore, it is not preferable. The polyamide resin to be used for the present invention is preferable to have a water content of 0.1 wt % or lower. If the water content exceeds 0.1 wt %, hydrolysis is caused at the time of melting and it may probably lead to rupture at the time of biaxial stretching and therefore, it is not preferable. In the case that nylon 6 is used as the aliphatic polyamide resin, the relative viscosity of nylon 6 is preferably 2.5 or higher and 3.6 or lower. If the relative viscosity is lower than 2.5, the impact strength of the film after biaxial stretching is lowered and therefore, it is not preferable. If the relative viscosity exceeds 3.6, it becomes difficult for an un-stretched film to be stretched by biaxial stretching and therefore, it is not preferable.

The laminated polyamide resin film of the present invention is preferable to be produced so-called co-extrusion method. That is, it is preferable to employ a method for obtaining an un-stretched film by loading polyamide resins to 2 to 3 extruders, layering the polyamide resins by using a multi-manifold with 2 to 3 layers or a feed block, extruding the layered body as a melted sheet from a dice, and cooling and solidifying the sheet by cooling rolls. In the case of obtaining an un-stretched film by such a method, for a purpose of improving the sheet flatness, it is preferable to employ an electrostatic close adhesion method or a liquid application close adhesion method for increasing the adhesion property of the sheet and a rotary cooling drum.

It is also preferable to add inorganic fine particles having a prescribed pore volume to the slippery layer containing the polyamide resin of the present invention. The types of inorganic fine particles are not particularly limited if they are of metal oxides such as silica, titanium dioxide, talc, kaolinite, etc.; metal salts such as calcium carbonate, calcium phosphate, barium sulfate, etc.; and fine particles inactive on polyamide resins, and in terms of easiness for adjusting the pore volume, porous silica fine particles are particularly preferable.

Two kinds of inorganic fine particles are preferable to be added. One kind of inorganic fine particles A have pore volume in a range preferably from 1.0 to 1.8 mL/g and more preferably from 1.2 to 1.6 mL/g. The other kind of inorganic fine particles B have pore volume in a range preferably less than 1.0 mL/g and more preferably from 0.4 mL/g to 0.9 mL/g. The pore volume in the present invention means the capacity (mL/g) of fine pores contained in 1 g of inorganic fine particles. If the pore volume exceeds 1.0 mL/g, the silica fine particles are deformed in the inside of the film when the un-stretched film is stretched and consequently, it becomes difficult to form the surface unevenness and the height of the projects on the surface becomes low. On the other hand, since no void is formed in the surroundings of the silica fine particles, high transparency can be retained. Addition of a large amount of silica fine particles makes it possible to form a large number of projects with low height on the film surface while keeping the high transparency. If the pore volume is lower than 1.0 mL/g, since silica fine particles are not deformed in the inside of the film when the un-stretched film is stretched and consequently, the surface unevenness with high height tends to be formed easily. On the o the hand, since voids are formed in the surroundings of the silica fine particles, the transparency is to be deteriorated and it becomes difficult to add a large quantity of the silica fine particles. Accordingly, it is preferable to use 2 kinds of inorganic fine particles with specified fine pore capacities.

The addition amount of the inorganic fine particles A to the slippery layer is preferably 0.3 wt % or more and 0.55 wt % or less and more preferably 0.4 wt % or more and 0.5 wt % or less. The addition amount of the inorganic fine particles B to the slippery layer is preferably 0.03 wt % or more and 0.1 wt % or less. If the addition amount of the inorganic fine particles A is less than 0.3 wt % and the addition amount of the inorganic fine particles B is less than 0.03 wt %, the surface roughness tends to be insufficient and the slipperiness in highly humid condition is difficult to be obtained and therefore, it is not preferable. Contrarily, if the addition amount of the inorganic fine particles A exceeds 0.55 wt % and the addition amount of the inorganic fine particles B exceeds 0.1 wt %, the transparency tends to be deteriorated and therefore, it is not preferable.

The average particle diameter of the inorganic fine particles A is preferably in a range from 2.0 to 7.0 μm and more preferably in a range from 3.0 to 7.0 μm. The average particle diameter of the inorganic fine particles B is preferably smaller than 3.0 μm. If the average particle diameter of the average inorganic fine particles A is smaller than 2.0 μm, it becomes difficult to form the surface unevenness and sufficient slipperiness cannot be obtained. If the average particle diameter of the inorganic fine particles A exceeds 7.0 μm and the average particle diameter of the average inorganic fine particles B is 3.0 μm or larger, the surface roughness becomes so significant as to probably deteriorate appearance and therefore, it is not preferable.

As a semi-aromatic polyamide resin, MXD6 is added in an amount of preferably 1.0 to 5.0 wt % and more preferably 2.0 to 4.0 wt % to the slippery layer. Addition of MXD6 extends the resin with low moisture absorption on the film surface and improves the slipperiness. If the addition amount of MXD6 is less than 1.0 wt %, the slipperiness becomes insufficient and therefore, it is not so much preferable. If the addition amount of MXD6 exceeds 5.0 wt %, due to the cost of the MXD6 raw material, the production cost becomes high and it is not so much preferable in terms of cost.

The substrate layer of the laminated polyamide resin film of the present invention contains an aliphatic polyamide resin and is preferable to contain mainly an aliphatic polyamide resin mixed with no lubricant of inorganic fine particles or the like. Without any particular problem, it is allowed to add refuse and recovered raw materials of defective products generated at the time of producing a biaxially oriented, laminated polyamide resin film to the substrate layer.

As the structure of the laminated polyamide resin film of the present invention, a bi- or tri-layer structure formed by layering the slippery layer on one or both faces of the substrate layer may be employed. The thickness of the laminated polyamide resin film of the present invention may be set arbitrarily in accordance with a practical use and it is generally 6 to 200 μm and preferably 15 to 25 μm. The ratio of the thickness of the slippery layer in the entire body of the film is 3 to 30% and preferably 10 to 27%. The transparency and the slipperiness are controlled in accordance with the thickness of the slippery layer and the respective fine pore capacities, average particle diameters, and addition amounts of the inorganic fine particles A and inorganic fine particles B to be added to the slippery layer. In the case that the total thickness of the slippery layer is less than 3%, the surface unevenness cannot be formed and sufficient slipperiness cannot be exhibited and therefore, it is not preferable. If the total thickness of the slippery layer exceeds 30 wt %, the transparency is inferior in the case that the film is stretched and it is not preferable.

The slippery layer is preferable to contain 2 kinds of inorganic fine particles. One kind of these inorganic fine particles are crushed and made flat by the stress at the time of oriented nylon stretching and form crushed and low surface projects. The other one are not crushed and do not become flat even by the stretching stress. Accordingly, high surface projects can be formed but voids are formed in the inside of the film and only a slight amount addition is allowed. Consequently, a large number of low projects are formed on the film surface and a small amount of surface projects high in the height are formed among the formers. Existence of these 2 kinds surface projects keeps high transparency and excellent slipperiness. Owing to this configuration, even if the addition amount of MXD6 is decreased, stable operability during film formation can be obtained and also stable physical properties in terms of quality can be obtained.

The laminated polyamide resin film of the present invention is produced by uniaxially or biaxially stretching an un-stretched film obtained by melt-extrusion of a mixture of a polyamide resin and inorganic fine particles. Practically, it is preferable to employ a successively biaxially stretching method by stretching a laminated un-stretched sheet, which has a substrate layer and a slippery layer and is obtained by melt co-extrusion with a T die, in the vertical direction by a roll type stretching machine, stretching the film in the transverse direction by a tenter type stretching machine, and thereafter carrying out heat fixation treatment and relaxation treatment. The cast temperature preferable in the melt extrusion is 240 to 290° C.; the vertical stretching condition is 2.8 to 4.0 times at 40 to 60° C.; the transverse stretching condition is 3.5 to 4.5 times at 60 to 170° C.; and the condition for the heat fixation treatment and relaxation treatment carried out after the stretching is in a range of 3 to 15% at 180 to 220° C. In accordance with the use, it is also possible to properly add stretching in the vertical direction and the transverse direction other than the vertical-transverse stretching.

In the vertical stretching method, it is possible to carry out stretching by a vertical-vertical-transverse stretching method. The vertical-vertical-transverse stretching method is a method for carrying out the first step stretching and successively carrying out the second step stretching without lowering the temperature to Tg or lower at the time of vertical stretching of a substantially un-stretched polyamide sheet, thereafter carrying out transverse stretching at a ratio of 3 times or higher, preferably 3.5 times or higher, and carrying out thermal fixation. In the case that the vertical-vertical-transverse stretching method is employed, a hot roll method and an infrared ray radiation method may be employed as the vertical stretching method.

In the case that the laminated polyamide resin film of the present invention is produced by the vertical-vertical-transverse stretching method, it is possible to obtain a biaxially oriented, laminated polyamide resin film with little physical property difference in the width direction.

In the case of producing a biaxially oriented, laminated polyamide resin film by the vertical-vertical-transverse stretching method, the first vertical stretching is preferably carried out at a temperature from 65 to 75° C. and about 1.3 to 1.7 times stretching. If the stretching ratio in the first step is so low as to be out of the above-mentioned range, boiling strain becomes significant if the film is boiled and practical usability is lowered. Contrarily, if the stretching ratio in the first step is so high as to be out of the above-mentioned range, the unevenness of the thickness in the vertical direction becomes significant and therefore, it is not preferable. The second vertical stretching is preferably carried out at a temperature from 80 to 90° C. and about 1.8 to 2.4 times stretching. If the stretching ratio in the second step is so low as to be out of the above-mentioned range, boiling strain becomes significant if the film is boiled and practical usability is lowered. Contrarily, if the stretching ratio in the second step is so high as to be out of the above-mentioned range, the strength (strength at the time of 5% elongation) in the longitudinal direction becomes low and therefore, it is not preferable. Execution of the vertical stretching separately in two steps as described can suppress stress at the time of stretching.

In the case of producing a biaxially oriented, laminated polyamide resin film by the vertical-vertical-transverse stretching method, the transverse stretching is preferably carried out at a temperature from 120 to 150° C. and about 2.8 to 5.5 times stretching. If the transverse stretching ratio is so low as to be out of the above-mentioned range, the strength (strength at the time of 5% elongation) in the transverse direction becomes low and therefore, it is not preferable. Contrarily, if the transverse stretching ratio is so high as to be out of the above-mentioned range, the heat shrinkage ratio in the transverse direction becomes significant and therefore, it is not preferable. On the other hand, if the temperature at the time of transverse stretching is so low as to be out of the above-mentioned range, the boiling stain becomes significant and therefore, it is not preferable. Contrarily, if the temperature at the time of transverse stretching is so high as to be out of the above-mentioned range, the strength (strength at the time of 5% elongation) in the transverse direction becomes low and therefore, it is not preferable.

Further, in the case of producing a biaxially oriented, laminated polyamide resin film by the vertical-vertical-transverse stretching method, the heat fixation treatment is preferably carried out at a temperature of 180 to 230° C. If the temperature of the heat fixation treatment is so low as to be out of the above-mentioned range, the heat shrinkage ratio in the longitudinal direction and the width direction becomes high and therefore, it is not preferable: and contrarily, if the temperature of the heat fixation treatment is so high as to be out of the above-mentioned range, the impact strength of the biaxially stretched film is lowered and therefore, it is not preferable.

In addition, in the case of producing a laminated polyamide resin film by the vertical-vertical-transverse stretching method, it is preferable to carry out relaxation treatment by keeping the film at a high temperature and in a position in which the width is shrunk at 5 to 10% of the maximum width in the TD vertical direction. If the ratio of the relaxation treatment is so low as to be out of the above-mentioned range, the heat shrinkage ratio in the longitudinal direction and the width direction becomes high and therefore, it is not preferable: and contrarily, if the temperature of the heat fixation treatment is so high as to be out of the above-mentioned range, the strength (strength at the time of 5% elongation) in the longitudinal direction and the width direction becomes low and therefore, it is not preferable.

In addition, it is allowed to add various kinds of additives such as a lubricant, a blocking prevention agent, a thermal stabilizer, an antioxidant, an antistatic agent, a light fastness agent, an impact resistance improver, etc., to the biaxially oriented, laminated polyamide resin film to an extent that the properties are not inhibited. If an organic lubricant such as ethylene bis(stearic acid amide) (EBS) or the like which causes an effect of lowering particularly the surface energy is added, the slipperiness of the film is more excellent and therefore, it is preferable. In addition, if the amount of EBS is lower than 0.05 wt %, it does not contribute to the improvement of the slipperiness. Contrarily, if the amount of EBS exceeds 0.30 wt %, the transparency of the film and adhesion of the film surface are worsened and therefore, it is not preferable.

Further, the laminated polyamide resin film of the present invention may be subjected to heat treatment and moisture control treatment for improving the size stability in accordance with the use. In addition, to improve the adhesion of the film surface, corona treatment, coating treatment, flame treatment, or the like may be carried out, or processing such as printing, processing, vapor deposition, lamination, or the like may also be carried out.

The laminated polyamide resin film of the present invention obtained in the above-mentioned modes has a static friction coefficient of preferably 0.9 or lower and more preferably 0.7 or lower in the atmosphere of 65% RH. If the static friction coefficient exceeds 0.9, the processability for subjecting the film to the process such as bagmaking process or the like is worsened and therefore, it is not preferable. On the other hand, if the static friction coefficient is lower than 0.2 in the atmosphere of 65% RH, rolling shift at the time of rolling the film on a roll tends to occur and therefore, it is not preferable.

% of nylon 6 (the same physical property as that of Chips A) and 10.0 wt % of silica particles (Silysia series, manufactured by FUJI SILYSIA CHEMICAL LTD.). Chips I were 100 wt % of poly(m-xylylene adipamide (MXD6) (T-600, manufactured by TOYOBO CO., LTD.) having relative viscosity of 2.1. The pore volume and the average particle diameter of the silica fine particles added respectively were measured by the following methods.

TABLE 1 composition of adjusting resin chip

| | base resin | | organic lubricant | inorganic lubricant | | | |
|---|---|---|---|---|---|---|---|
| | nylon 6 (wt %) | relative viscosity | EBS (wt %) | silica fine particle | pore volume (ml/g) | average particle diameter (μm) | addition amount (wt %) |
| chips A | 100.0 | 2.9 | — | — | — | — | — |
| | [Product name: T-810, manufactured by TOYOBO CO., LTD.] | | | | | | |
| chips B | 95.0 | 2.9 | 5.0 | — | — | — | — |
| chips C | 90.0 | 2.9 | — | Silysia350 | 1.6 | 3.9 | 10.0 |
| chips D | 90.0 | 2.9 | — | Silysia370 | 1.6 | 6.4 | 10.0 |
| chips E | 90.0 | 2.9 | — | Silysia420 | 1.25 | 3.1 | 10.0 |
| chips F | 90.0 | 2.9 | — | Silysia530 | 0.8 | 2.7 | 10.0 |
| chips G | 90.0 | 2.9 | — | Silysia550 | 0.8 | 3.9 | 10.0 |
| chips H | 90.0 | 2.9 | — | Silysia710 | 0.44 | 2.8 | 10.0 | composition of resin

| | base resin | | organic lubricant | inorganic lubricant | | | |
|---|---|---|---|---|---|---|---|
| | poly (m-xylylene adipamide (wt %) | relative viscosity | EBS (wt %) | silica fine particle | pore volume (ml/g) | average particle diameter (μm) | addition amount (wt %) |
| chips I | 100.6 | 2.1 | — | — | — | — | — |
| | [Product name: T-600, manufactured by TOYOBO CO., LTD.] | | | | | | |

*EBS(ethylene bis(stearic acid amide)): Light Amide WE-183, manufactured by KYOEISHA CHEMICAL Co., LTD.
*silica fine particle: Silysia series, manufactured by FUJI SILYSIA CHEMICAL LTD.

Further, the laminated polyamide resin film of the present invention has a haze value of preferably 3.0% or lower and more preferably 2.5% or lower. If haze value exceeds 3.0%, the transparency is worsened, it becomes difficult to use the film as a food packaging material, particularly a packaging material with high design properties based on the transparency and therefore, it is not preferable.

EXAMPLES

Hereinafter, a laminated polyamide resin film of the present invention will be described practically with reference to Examples, but it is not intended to limit the present invention to the aspects of Examples.
(Raw Materials to be Used)
Chips A were 100.0 wt % of nylon 6 (T-810, manufactured by TOYOBO CO., LTD.) obtained by ring-opening polymerization of ε-caprolactam by using a batch type polymerization pot. The relative viscosity of the obtained nylon 6 chips was about 2.9 as a measurement value at 20° C. (at the time of using 96% concentrated sulfuric acid solution). Chips B consisted of 95.0 wt % of nylon 6 (the same physical property as that of Chips A) and 5.0 wt % of ethylene bis(stearic acid amide) (Light Amide WE-183, manufactured by KYOEISHA CHEMICAL Co., LTD.). Hereinafter, Chips C to H respectively consisted of 90.0 wt (Pore Volume)
Using an accelerated specific surface area and porosimetry apparatus (ASAP 2400) manufactured by Shimadzu Corporation, the pore volume among prescribed fine pore diameter (17 to 3000 Angstrom) was integrated by BJH method based on adsorption and desorption of nitrogen. (See Shimadzu hyoron, vol. 48, no. 1, pp. 35-49, for detail).
(Average Particle Diameter)
The average particle diameter of the silica fine particles was the value measured by laser scattering method.

Examples 1

(Production of Resin for Forming Slippery Layer)
The raw material ratios were as described in the raw material mixing table, Table 2. Chips A, Chips B, Chips C, Chips F, and Chips I were added in an amount of 88.55 wt %, 3.0 wt %, 5.0 wt %, 0.45 wt %, and 3.0 wt %, respectively.
(Production of Resin for Forming Substrate Layer)
Nylon 6 (same physical property as that of Chips A) was also used for a resin for forming a substrate layer. The raw material ratios were as described in the raw material mixing table, Table 2. Assuming that the compositions of films produced could contain 30% as recovered raw material, Chips A, Chips B, Chips C, Chips F, and Chips I were added in an amount of 99.16%, 0.22%, 0.37%, 0.03%, and 0.22%, respectively.

TABLE 2

| | prescription of the slippery layer | prescription of the substrate layer | thickness ratio of the slippery layer | composition of the layer |
|---|---|---|---|---|
| Example 1 | chips A(88.55%) + chips B(3.00%) + chips C(5.00%) + chips F(0.45%) + chips I(3.00%) | chips A(99.16%) + chips B(0.22%) + chips C(0.37%) + chips F(0.03%) + chips I(0.22%) | 20 | slippery layer/ substrate layer/ slippery layer |
| Example 2 | chips A(88.55%) + chips B(3.00%) + chips C(5.00%) + chips F(0.45%) + chips I(5.00%) | chips A(99.01%) + chips B(0.22%) + chips C(0.37%) + chips F(0.03%) + chips I(0.37%) | 20 | slippery layer/ substrate layer/ slippery layer |
| Example 3 | chips A(88.55%) + chips B(3.00%) + chips C(5.00%) + chips F(0.45%) + chips I(3.00%) | chips A(98.87%) + chips B(0.30%) + chips C(0.49%) + chips F(0.04%) + chips I(0.30%) | 26.7 | slippery layer/ substrate layer/ slippery layer |
| Example 4 | chips A(90.55%) + chips B(3.00%) + chips C(5.00%) + chips F(0.45%) + chips I(1.00%) | chips A(99.07%) + chips B(0.30%) + chips C(0.49%) + chips F(0.04%) + chips I(0.10%) | 26.7 | slippery layer/ substrate layer/ slippery layer |
| Example 5 | chips A(88.55%) + chips B(3.00%) + chips C(5.00%) + chips F(0.45%) + chips I(3.00%) | chips A(99.16%) + chips B(0.22%) + chips C(0.37%) + chips F(0.03%) + chips I(0.22%) | 20 | slippery layer/ substrate layer |
| Example 6 | chips A(88.30%) + chips B(3.00%) + chips C(5.00%) + chips F(0.70%) + chips I(3.00%) | chips A(99.41%) + chips B(0.15%) + chips C(0.25%) + chips F(0.04%) + chips I(0.15%) | 13.3 | slippery layer/ substrate layer/ slippery layer |
| Example 7 | chips A(88.00%) + chips B(3.00%) + chips C(5.00%) + chips F(1.00%) + chips I(3.00%) | chips A(99.88%) + chips B(0.08%) + chips C(0.13%) + chips F(0.03%) + chips I(0.08%) | 6.7 | slippery layer/ substrate layer |
| Example 8 | chips A(89.55%) + chips B(3.00%) + chips C(4.00%) + chips F(0.45%) + chips I(3.00%) | chips A(99.23%) + chips B(0.22%) + chips C(0.30%) + chips F(0.03%) + chips I(0.22%) | 20 | slippery layer/ substrate layer/ slippery layer |
| Example 9 | chips A(89.55%) + chips B(3.00%) + chips C(4.00%) + chips F(0.45%) + chips I(3.00%) | chips A(98.97%) + chips B(0.30%) + chips C(0.39%) + chips F(0.04%) + chips I(0.30%) | 26.7 | slippery layer/ substrate layer/ slippery layer |
| Example 10 | chips A(88.55%) + chips B(3.00%) + chips E(5.00%) + chips F(0.45%) + chips I(3.00%) | chips A(99.16%) + chips B(0.22%) + chips E(0.37%) + chips F(0.03%) + chips I(0.22%) | 20 | slippery layer/ substrate layer/ slippery layer |
| Example 11 | chips A(88.55%) + chips B(3.00%) + chips D(5.00%) + chips F(0.45%) + chips I(3.00%) | chips A(99.16%) + chips B(0.22%) + chips D(0.37%) + chips F(0.03%) + chips I(0.22%) | 20 | slippery layer/ substrate layer/ slippery layer |
| Example 12 | chips A(88.55%) + chips B(3.00%) + chips C(5.00%) + chips H(0.45%) + chips I(3.00%) | chips A(99.16%) + chips B(0.22%) + chips C(0.37%) + chips H(0.03%) + chips I(0.22%) | 20 | slippery layer/ substrate layer/ slippery layer |
| Comparative Example 1 | chips A(88.55%) + chips B(3.00%) + chips C(5.00%) + chips F(0.45%) + chips I(3.00%) | chips A(98.39%) + chips B(0.42%) + chips C(0.71%) + chips F(0.06%) + chips I(0.42%) | 40 | slippery layer/ substrate layer/ slippery layer |
| Comparative Example 2 | chips A(90.75%) + chips B(3.00%) + chips C(2.80%) + chips F(0.45%) + chips I(3.00%) | chips A(99.08%) + chips B(0.30%) + chips C(0.28%) + chips F(0.04%) + chips I(0.30%) | 26.7 | slippery layer/ substrate layer/ slippery layer |
| Comparative Example 3 | chips A(88.75%) + chips B(3.00%) + chips C(5.00%) + chips F(0.25%) + chips I(3.00%) | chips A(99.43%) + chips B(0.15%) + chips C(0.25%) + chips F(0.02%) + chips I(0.15%) | 13.3 | slippery layer/ substrate layer/ slippery layer |
| Comparative Example 4 | chips A(91.65%) + chips B(3.00%) + chips C(5.00%) + chips F(0.35%) | chips A(99.19%) + chips B(0.30%) + chips C(0.49%) + chips F(0.03%) | 26.7 | slippery layer/ substrate layer/ slippery layer |
| Comparative Example 5 | chips A(89.00%) + chips B(3.00%) + chips D(5.00%) + chips I(3.00%) | chips A(99.19%) + chips B(0.22%) + chips D(0.37%) + chips I(0.22%) | 20 | slippery layer/ substrate layer/ slippery layer |
| Comparative Example 6 | chips A(88.55%) + chips B(3.00%) + chips C(5.00%) + chips G(0.45%) + chips I(3.00%) | chips A(99.16%) + chips B(0.22%) + chips C(0.37%) + chips G(0.03%) + chips I(0.22%) | 20 | slippery layer/ substrate layer/ slippery layer |
| Comparative Example 7 | chips A(87.80%) + chips B(3.00%) + chips C(5.00) + chips F(1.2%) + chips I(3%) | chips A(99.39%) + chips B(0.15%) + chips C(0.25%) + chips F(0.06%) + chips I(0.15%) | 13.3 | slippery layer/ substrate layer/ slippery layer |
| Comparative Example 8 | chips A(88.05%) + chips B(3.00%) + chips D(5.50%) + chips F(0.45%) + chips I(3.00%) | chips A(99.12%) + chips B(0.22%) + chips D(0.41%) + chips F(0.03%) + chips I(0.22%) | 20 | slippery layer/ substrate layer/ slippery layer | thickness ratio of the slippery layer(%) = (the total thickness of the slippery layer/the thickness of the entire laminated film) × 100

Respective raw materials for a slippery layer and a substrate layer were melted and supplied to T dies by respectively different extruders and extruded into a sheet-like form by successively laminating in the slippery layer/ substrate layer/slippery layer order and the sheet was rolled on a metal drum adjusted at 40° C. and cooled to produce an un-stretched laminated sheet with thickness of about 200 μm and having a tri-layer structure of slippery layer/substrate layer/slippery layer. The thickness of the slippery layer and the substrate layer was as described in Table 2 and the ratio of the thickness was as the slippery layer/substrate layer/slippery layer=10/80/10(%) in the entire thickness.

Thereafter, the obtained un-stretched sheet was vertically stretched at stretching temperature of about 80° C. and about 1.8 times in the first step and thereafter vertically stretched at stretching temperature of about 70° C. and about 1.8 times in the second step while keeping the temperature at 70° C. and, successively the sheet was continuously led to a tenter, transversely stretched about 130° C. and about 4.0 times, subjected to heat fixation at about 210° C. and to transverse relaxation treatment of 5.0%, successively cooled, and cut off in both rim parts to obtain a biaxially oriented, laminated polyamide resin film of Example 1. In the obtained biaxially oriented, laminated polyamide resin film, the thickness of the slippery layer was about 1.5 μm, the thickness of the substrate layer was 12.0 μm, and the total thickness was 15.0 μm.

Using the obtained biaxially oriented, laminated polyamide resin film of Example 1, the properties such as static friction coefficient in highly humid environments (65% RH) and haze (transparency) were evaluated. Further, using the obtained biaxially oriented, laminated polyamide resin film, bagmaking process was carried out and the workability (processing property) at that time was evaluated. The evaluation results are described in Table 3. The evaluation results were those measured by the following measurement methods.

(Static Friction Coefficient at 65% RH)

The static friction coefficient at 23° C. and 65% RH was measured according to ASTM-D1894. If the static friction coefficient is 0.9 or lower, it is considered that the slipperiness is good and processability is excellent.

(Haze Value)

The haze value of a film was measured according to JIS-K6714 by using a haze meter manufactured by NIPPON DENSHOKU INDUSTRIES CO., LTD. If the haze value is 4.0% or lower, the film can be used effectively as a packaging material with high design properties for which transparency is required and if it is 3.0% or lower, it is considered that the film is good.

Examples 2 to 12

Biaxially oriented, laminated polyamide resin films of Examples 2 to 12 were obtained in the same manner as that in Example 1, except that, regarding the mixing ratios of raw materials, the pore volume, average particle diameter, and addition amount of the silica fine particles to be added were changed, the addition amount of MXD6 to be added was changed, the thickness ratio and combination structure of the slippery layer and the substrate layer to be laminated was changed as shown in Table 3. The properties of the biaxially oriented, laminated polyamide resin films of Examples 2 to 12 were evaluated in the same methods as those employed in Example 1. The evaluation results are described in Table 3.

Comparative Examples 1 to 8

Biaxially oriented, laminated polyamide resin films of Comparative Examples 1 to 8 were obtained in the same manner as that in Example 1, except that, regarding the mixing ratios of raw materials, the pore volume, average particle diameter, and addition amount of the silica fine particles to be added were changed, the addition amount of MXD6 to be added was changed, the thickness ratio and combination structure of the slippery layer and the substrate layer to be laminated was changed as shown in Table 3. The properties of the biaxially oriented, laminated polyamide resin films of Comparative Examples 1 to 8 were evaluated in the same methods as those employed in Example 1. The evaluation results are described in Table 3.

TABLE 3

| | | | silica fine particle in the slippery layer | | | | | |
|---|---|---|---|---|---|---|---|---|
| | thickness ratio | | silica fine particle A | | | silica fine particle B | | |
| standard | layer A:slippery layer layer B:substrate layer | addition amount of MXD6 (wt %) | pore volume (ml/g) | average particle diameter (μm) | addition amount (wt %) | pore volume (ml/g) | average particle diameter (μm) | addition amount (wt %) |
| Example 1 | A/B/A 1.5/12/1.5 | 3 | 1.60 | 3.90 | 0.50 | 0.80 | 2.70 | 0.045 |
| Example 2 | A/B/A 1.5/12/1.5 | 5 | 1.60 | 3.90 | 0.50 | 0.80 | 2.70 | 0.045 |
| Example 3 | A/B/A 2.0/11/2.0 | 3 | 1.60 | 3.90 | 0.50 | 0.80 | 2.70 | 0.045 |
| Example 4 | A/B/A 2.0/11/2.0 | 1 | 1.60 | 3.90 | 0.50 | 0.80 | 2.70 | 0.045 |
| Example 5 | A/B 3.0/12 | 3 | 1.60 | 3.90 | 0.50 | 0.80 | 2.70 | 0.045 |
| Example 6 | A/B/A 1.0/13/1.0 | 3 | 1.60 | 3.90 | 0.50 | 0.80 | 2.70 | 0.070 |
| Example 7 | A/B 1.0/14 | 3 | 1.60 | 3.90 | 0.50 | 0.80 | 2.70 | 0.10 |
| Example 8 | A/B/A 1.5/12/1.5 | 3 | 1.60 | 3.90 | 0.40 | 0.80 | 2.70 | 0.045 |
| Example 9 | A/B/A 2.0/11/2.0 | 3 | 1.60 | 3.90 | 0.40 | 0.80 | 2.70 | 0.045 |
| Example 10 | A/B/A 1.5/12/1.5 | 3 | 1.25 | 3.10 | 0.50 | 0.80 | 2.70 | 0.045 |
| Example 11 | A/B/A 1.5/12/1.5 | 3 | 1.60 | 6.40 | 0.50 | 0.80 | 2.70 | 0.045 |
| Example 12 | A/B/A 1.5/12/1.5 | 3 | 1.60 | 3.90 | 0.50 | 0.44 | 2.80 | 0.045 |
| Comparative Example 1 | A/B/A 3.0/9/3.0 | 3 | 1.60 | 3.90 | 0.50 | 0.80 | 2.70 | 0.045 |
| Comparative Example 2 | A/B/A 2.0/11/2.0 | 3 | 1.60 | 3.90 | 0.28 | 0.80 | 2.70 | 0.045 |
| Comparative Example 3 | A/B/A 1.0/13/1.0 | 3 | 1.60 | 3.90 | 0.50 | 0.80 | 2.70 | 0.025 |
| Comparative Example 4 | A/B/A 2.0/11/2.0 | 0 | 1.60 | 3.90 | 0.50 | 0.80 | 2.70 | 0.045 |
| Comparative Example 5 | A/B/A 1.5/12/1.5 | 3 | 1.60 | 6.40 | 0.50 | — | — | — |

TABLE 3-continued

| | | | | | | | | |
|---|---|---|---|---|---|---|---|---|
| Comparative Example 6 | A/B/A 1.5/12/1.5 | 3 | 1.60 | 3.90 | 0.50 | 0.80 | 3.90 | 0.045 |
| Comparative Example 7 | A/B/A 1.0/13/1.0 | 3 | 1.60 | 3.90 | 0.50 | 0.80 | 2.70 | 0.12 |
| Comparative Example 8 | A/B/A 1.5/12/1.5 | 3 | 1.60 | 6.40 | 0.55 | 0.80 | 2.70 | 0.045 |

| standard | addition amount of recovered raw material in substrate layer (wt %) | properties of the film | | | remark |
|---|---|---|---|---|---|
| | | μs 65% RH | transparency haze (%) | property of bagmaking process | |
| Example 1 | 30 | 0.8 | 2.20 | good | |
| Example 2 | 30 | 0.6 | 2.40 | good | |
| Example 3 | 30 | 0.4 | 2.80 | good | |
| Example 4 | 30 | 0.8 | 2.60 | good | |
| Example 5 | 30 | 0.3 | 2.50 | good | |
| Example 6 | 30 | 0.8 | 2.50 | good | |
| Example 7 | 30 | 0.9 | 3.00 | good | |
| Example 8 | 30 | 1.0 | 2.00 | good | |
| Example 9 | 30 | 0.8 | 2.20 | good | |
| Example 10 | 30 | 0.9 | 2.50 | good | |
| Example 11 | 30 | 0.8 | 2.20 | good | |
| Example 12 | 30 | 0.9 | 2.50 | good | |
| Comparative Example 1 | 30 | 0.3 | 5.50 | good | faulty transparency |
| Comparative Example 2 | 30 | 1.0 | 1.75 | fault | |
| Comparative Example 3 | 30 | 1.2 | 1.50 | fault | |
| Comparative Example 4 | 30 | 1.0 | 2.20 | fault | |
| Comparative Example 5 | 30 | 1.1 | 2.40 | fault | |
| Comparative Example 6 | 30 | 0.5 | 3.50 | good | faulty transparency |
| Comparative Example 7 | 30 | 0.5 | 4.50 | good | faulty transparency |
| Comparative Example 8 | 30 | 0.4 | 3.20 | good | faulty transparency |

From Table 1 and Table 2, it is understood that the films of Examples 1 to 12 having pore volume and content of inorganic fine particles contained in the slippery layer, a static friction coefficient in 65% RH environments, and a haze value adjusted to be within the specified ranges were good in all of the slipperiness, transparency, and processing properties. On the other hand, it is understood that the films of Comparative Examples 1 to 8 having one of the pore volume and content of inorganic fine particles contained in the slippery layer, the static friction coefficient in 65% RH environments, and the haze value out of the specified ranges were undesirable in one of the slipperiness, transparency, and processing properties.

INDUSTRIAL APPLICABILITY

Since having excellent properties as described, a biaxially oriented, laminated polyamide resin film of the present invention can be used preferably as a film for packaging.

The invention claimed is:

1. A biaxially oriented, laminated polyamide resin film comprising at least one substrate layer and at least one slippery layer,
wherein
the biaxially oriented, laminated polyamide resin film has a thickness of 6 to 25 μm, a static friction coefficient of 0.9 or lower at 23° C. and 65% RH, and a haze value of 3.0% or lower,
the substrate layer comprises an aliphatic polyamide resin consisting of nylon 6,
the slippery layer contains (i) at least 2 kinds of polyamide resins consisting of nylon 6 and 1 to 5 wt % of a semi-aromatic polyamide resin, (ii) 3000 to 5000 ppm of inorganic fine particle A having a pore volume of 1.0 to 1.8 mL/g and an average particle diameter of 3 to 7 μm, and (iii) 300 to 1000 ppm of inorganic fine particle B having a pore volume of less than 1.0 mL/g and an average particle diameter of smaller than 3 μm, and
the substrate layer contains not more than 0.37 wt % of poly(m-xylylene adipamide).

2. The biaxially oriented, laminated polyamide resin film according to claim 1, wherein the slippery layer contains 0.05 to 0.30 wt % of ethylene bis(stearic acid amide).

3. The biaxially oriented, laminated polyamide resin film according to claim 2, wherein the biaxially oriented, laminated polyamide resin film is produced by a co-extrusion method and the slippery layer is layered on at least one face or both faces of the substrate layer.

4. The biaxially oriented, laminated polyamide resin film according to claim 3, wherein the thickness ratio of the total thickness of the slippery layer to the thickness of the entire laminated film is 6 to 30%.

5. The biaxially oriented, laminated polyamide resin film according to claim 4, wherein the substrate layer contains an aliphatic polyamide resin, or an aliphatic polyamide as well as a raw material recovered from its film.

6. The biaxially oriented, laminated polyamide resin film according to claim 3, wherein the substrate layer contains an aliphatic polyamide resin, or an aliphatic polyamide as well as a raw material recovered from its film.

7. The biaxially oriented, laminated polyamide resin film according to claim 2, wherein the thickness ratio of the total thickness of the slippery layer to the thickness of the entire laminated film is 6 to 30%.

8. The biaxially oriented, laminated polyamide resin film according to claim 7, wherein the substrate layer contains an aliphatic polyamide resin, or an aliphatic polyamide as well as a raw material recovered from its film.

9. The biaxially oriented, laminated polyamide resin film according to claim 2, wherein the substrate layer contains an aliphatic polyamide resin, or an aliphatic polyamide as well as a raw material recovered from its film.

10. The biaxially oriented, laminated polyamide resin film according to claim 1, wherein the biaxially oriented, laminated polyamide resin film is produced by a co-extrusion method and the slippery layer is layered on at least one face or both faces of the substrate layer.

11. The biaxially oriented, laminated polyamide resin film according to claim 10, wherein the thickness ratio of the total thickness of the slippery layer to the thickness of the entire laminated film is 6 to 30%.

12. The biaxially oriented, laminated polyamide resin film according to claim 11, wherein the substrate layer contains an aliphatic polyamide resin, or an aliphatic polyamide as well as a raw material recovered from its film.

13. The biaxially oriented, laminated polyamide resin film according to claim 10, wherein the substrate layer contains an aliphatic polyamide resin, or an aliphatic polyamide as well as a raw material recovered from its film.

14. The biaxially oriented, laminated polyamide resin film according to claim 1, wherein the thickness ratio of the total thickness of the slippery layer to the thickness of the entire laminated film is 6 to 30%.

15. The biaxially oriented, laminated polyamide resin film according to claim 1, wherein the substrate layer contains an aliphatic polyamide resin, or an aliphatic polyamide as well as a raw material recovered from its film.

* * * * *